US008186243B2

(12) United States Patent
Horikoshi et al.

(10) Patent No.: US 8,186,243 B2
(45) Date of Patent: May 29, 2012

(54) THROTTLE CONTROL DEVICE

(75) Inventors: Yoshinori Horikoshi, Maebashi (JP); Hiroki Kato, Takasaki (JP)

(73) Assignee: Starting Industrial Co., Ltd., Tokyo (JP)

(*) Notice: Subject to any disclaimer, the term of this patent is extended or adjusted under 35 U.S.C. 154(b) by 457 days.

(21) Appl. No.: 12/449,627

(22) PCT Filed: Feb. 25, 2008

(86) PCT No.: PCT/JP2008/053183

§ 371 (c)(1),
(2), (4) Date: Aug. 18, 2009

(87) PCT Pub. No.: WO2008/105367

PCT Pub. Date: Sep. 4, 2008

(65) Prior Publication Data

US 2010/0116083 A1 May 13, 2010

(30) Foreign Application Priority Data

Feb. 28, 2007 (JP) ................................ 2007-050213

(51) Int. Cl.
*F16C 1/12* (2006.01)

(52) U.S. Cl. ...................................................... 74/501.6

(58) Field of Classification Search ................. 74/500.5, 74/501.6, 502.2; 56/10.8
See application file for complete search history.

(56) References Cited

U.S. PATENT DOCUMENTS 4,611,502 A * 9/1986 Gregory .......................... 74/502
5,865,155 A * 2/1999 Nagashima ................... 123/398
5,931,514 A 8/1999 Chung
6,196,082 B1 * 3/2001 Iwata ........................... 74/501.6
6,591,507 B2 * 7/2003 Kobayashi et al. ............ 30/276

FOREIGN PATENT DOCUMENTS

JP A-11-89383 4/1999
JP A-11-310182 11/1999
JP A-2000-504400 4/2000
JP A-2003-13755 1/2003
JP A-2005-259457 9/2005

* cited by examiner

*Primary Examiner* — Vicky Johnson
(74) *Attorney, Agent, or Firm* — Oliff & Berridge, PLC

(57) ABSTRACT

In this throttle control device, the device body secured to a steering wheel is provided with a throttle lever for pulling a control cable and the cover is attached to the upper part of the device body. The throttle control device includes a protruded rim that is formed on one of the outer surfaces of the upper both side walls of the device body and the inner surfaces of both side parts of the cover, a recessed groove capable of slidably engaging with the rim is slantingly formed in the other, the protruded rim is engaged with the recessed groove and slid, and the cover is locked to the device body at its slid end whereby the cover is fixed onto the device body.

1 Claim, 5 Drawing Sheets

THROTTLE CONTROL DEVICE

TECHNICAL FIELD

The present invention relates to a throttle control device in which a lid is mounted on a device body having a throttle lever simply by sliding without using a screw.

BACKGROUND ART

Generally, a handle pipe for power equipment such as a brush cutter, a tiller, a rice planter or a mower includes a throttle control device having a throttle lever so as to control rotation of an engine by controlling an amount of pulling of the throttle lever. For example, the brush cutter includes an engine such as a gasoline engine on one end side of a handle pipe, and a rotary blade driven by the engine via a drive shaft placed inside the handle pipe on the other end side, and particularly includes a throttle control device that is placed near a grip of the handle pipe and controls rotation of the engine.

A device body is formed into a case shape with an open upper portion on which a lid is mounted mainly due to assembly of components such as a wire or a throttle lever. The lid is secured to the upper portion of the device body by a securing screw.

[Patent Document 1] Japanese Patent Laid-Open No. 2003-13755

DISCLOSURE OF THE INVENTION

Problems to be Solved by the Invention

However, screwing the lid requires an operation of positioning the lid in a predetermined position on the device body, then inserting the screw and further rotating the screw with a screwdriver, and this increases the number of assembly steps and makes the operation troublesome.

The present invention solves the above described problem, and has an object to provide a throttle control device in which a lid can be reliably mounted on a device body without using a screw.

Means for Solving the Problems

To achieve the above described object, the invention according to a first aspect provides a throttle control device including: a device body secured to an operation handle and having a throttle lever for pulling a control wire; and a lid mounted on an upper portion of the device body, characterized in that a ridge is formed on one of outer side surfaces of upper opposite side walls of the device body and inner side surfaces of opposite side portions of the lid, a recessed groove slidably engageable with the ridge is obliquely formed in the other, the ridge is engaged in the recessed groove and slid, and the lid is locked to the device body at a slide end and secured on the device body.

The invention according to a second aspect is characterized in that a locking portion between the lid and the device body is formed on a lower end surface of the lid and an end surface of the device body that receives the lower end surface in the first aspect.

Advantages of the Invention

According to the invention in the first aspect, the ridge is formed on one of the outer side surfaces of the upper opposite side walls of the device body and the inner side surfaces of the opposite side portions of the lid, the recessed groove slidably engageable with the ridge is obliquely formed in the other, the ridge is engaged in the recessed groove and slid, and the lid is locked to the device body at the slide end and secured on the device body. Thus, a lower end of the ridge on the lid is engaged in an upper end of the recessed groove and the ridge is obliquely slid along the recessed groove. As the ridge is slid along the recessed groove, the lid approaches the device body. Then, the ridge is slid until the lower end thereof abuts against a lower end of the recessed groove. Simultaneously, a lower end of a rear side surface portion of the lid is pressed against a step on the device body to lock a locking protrusion on the lid in a locking groove in the device body. At this time, the lower end of the lid abuts against and is integrally connected to the step on the device body.

As such, when the lid is mounted on the device body, the lid is obliquely slid from up to down and finally locked on the side opposite to the ridge and the recessed groove. Thus, even if the lid is to be slid in an opposite direction, the lid is locked to the device body and cannot be moved in the opposite direction, thereby allowing the lid to be easily and reliably mounted on the device body without using a screw or the like. This can reduce the number of components or the number of assembly steps, and also reduce costs.

According to the second aspect, the locking portion between the lid and the device body is formed on the lower end surface of the lid and the end surface of the device body that receives the lower end surface. Thus, the lid is slid obliquely from up to down with respect to the device body, and then the lid is pressed downward at the slide end and thus locked to the device body. This facilitates a mounting operation of the lid.

DESCRIPTION OF THE PREFERRED EMBODIMENTS

FIG. 1 is a side view of a throttle control device provided on an operation handle of power equipment such as a mower, FIG. 2 is a vertical sectional view of the throttle control device, and FIGS. 3 and 4 are exploded perspective views of the throttle control device.

In the drawings, reference character A denotes a throttle control device. The throttle control device A includes a device body 1 secured to an operation handle B and having a throttle lever 3 for pulling a control wire 2, a lid 4 is mounted on an upper portion of the device body 1, and a start/stop switch button 5 of an engine is provided on the lid 4 slidably in start and stop directions.

The device body 1 is formed into a substantially rectangular box shape on plan view, upper and lower portions are opened, and a mounting hole 7 of the operation handle B is formed in a front wall. A lower end of the mounting hole 7 terminates, and bolts 8 are fastened from opposite sides thereof to secure the operation handle B.

A spindle 10 is provided in lower portions of opposite side walls, and the throttle lever 3 is rotatably supported by the spindle 10. The wire 2 is connected to an upper portion of the throttle lever 3, and a lower portion of the throttle lever 3 operably protrudes downward of the device body 1.

The wire 2 is constituted by an outer wire 2*a* and an inner wire 2*b*, the outer wire 2*a* is secured to a mounting shaft 11 having a U-shaped section and protruding from one side of the device body 1, the inner wire 2*b* passes through the inside of the mounting shaft 11, and a drum 12 provided at an end of the mounting shaft 11 is connected to an upper end portion of the throttle lever 3. Thus, an amount of pulling of the throttle lever 3 can be controlled to control throttle of the engine.

Further, a step 15 is formed on an upper portion of each of opposite side walls 13 and a rear wall 14 of the device body 1, and a recessed groove 17 is obliquely formed in an outer side surface 16 on the side of the mounting shaft 11 in an upper portion of the step 15 of each of the opposite side walls 13. An upper end portion 17*a* of the recessed groove 17 opens in an end surface of each of the opposite side walls 13 of the device body 1. A locking groove 18 is formed in an upper end of the step 15 of the rear wall 14.

Next, the lid 4 is constituted by a rectangular upper surface portion 20, and a rear side surface portion 21 and left and right side surface portions 22 formed on three sides downwardly from the upper surface portion 20, and a side surface portion on a "START" side (front side) is opened. A slot 24 is formed in the middle of the upper surface portion 20 of the lid 4, and the start/stop switch button 5 is provided in the slot 24 slidably in start and stop directions. Wiring for turning on/off the engine is provided on a bottom surface of the upper surface portion 20. On an inner side surface of each of the left and right side surface portions 22, a ridge 25 slidably engageable in the recessed groove 17 is obliquely formed in an inner side surface 23 corresponding to the recessed groove 17. A locking protrusion 26 having a triangular section is formed on a lower end surface of the rear side surface portion 21. The lower end of the rear side surface portion corresponds to the step 15 on the rear wall 14 of the device body 1, and the locking protrusion 26 is formed lockably in the locking groove 18 in the device body 1.

When the lid 4 thus configured is mounted on the device body 1, as shown in FIG. 5, a lower end of the ridge 25 on the lid 4 is engaged in the upper end portion 17*a* of the recessed groove 17 in the device body 1 and the ridge 25 is obliquely slid along the recessed groove 17. As the ridge 25 is slid along the recessed groove 17, the lid 4 approaches the device body 1. Then, the ridge 25 is slid until the lower end thereof abuts against a lower end portion 17*b* of the recessed groove 17. Simultaneously, a lower end of the rear side surface portion of the lid 4 is pressed against the step 15 on the device body 1 at the slide end to lock the locking protrusion 26 on the lid 4 in the locking groove 18 in the device body 1. At this time, the lower end of the lid 4 abuts against and is integrally connected to the step 15 on the device body 1.

With the above described configuration, when the lid 4 is mounted on the device body 1, the lid is obliquely slid from up to down and finally locked on the side opposite to the ridge 25 and the recessed groove 17. Thus, even if the lid 4 is to be slid in an opposite direction, the lid 4 is locked to the device body 1 and cannot be moved in the opposite direction, and is thus secured to the device body 1.

As means for mounting a lid to a device body without using a screw, a method is also supposed of mounting by laterally or vertically moving the lid and finally locking a locking flange formed on an inside of a side surface portion of the lid 4 in a locking hole in an outside of the device body. In this case, the side surface portion having the locking flange of the lid is laterally extended so that the locking flange is finally inserted into the locking hole by elasticity of the side surface portion. Thus, this method cannot be applied to a lid that is hard to be elastically deformed. However, with the throttle control device having the above described configuration, for a force applied to the lid during normal use, an operation load direction in moving the switch button is a fore/aft direction, and a force to obliquely move the lid is not applied, thereby preventing the lid from being removed.

The middle of the outer side surface 16 of the device body 1 is opened, and the middle of the lid 4 is also expanded. Forming the side surface of the device body or the lid as a continuous surface is not very common due to connection between members or the like. In this case, laterally continuously forming the ridge or the recessed groove is difficult. Also, for vertically forming the ridge or the recessed groove, one ridge or recessed groove is insufficient and a plurality of ridges or recessed grooves need to be formed.

On the other hand, with the configuration in which the oblique ridge 25 is engaged in the recessed groove 17 as in the throttle control device A, a continuous long shape is not required, and locking may be made at an abutment portion between the lower end of the lid 4 and the step 15 on the device body 1, thereby simplifying a mounting operation.

In the embodiment, the recessed groove 17 is formed in the device body 1 and the ridge 25 is formed on the lid 4, but the present invention is not limited to this. On the contrary, the ridge may be formed on the device body and the recessed groove may be formed in the lid.

In the embodiment, the lid 4 is fitted into the outside of the device body 1, but on the contrary, the lid may be fitted into the inside of the device body.

Similarly, in the embodiment, the locking groove 18 is formed in the device body 1 and the locking protrusion 26 is formed in the lid 4, but may be vice versa.

DESCRIPTION OF SYMBOLS

Figure 1:
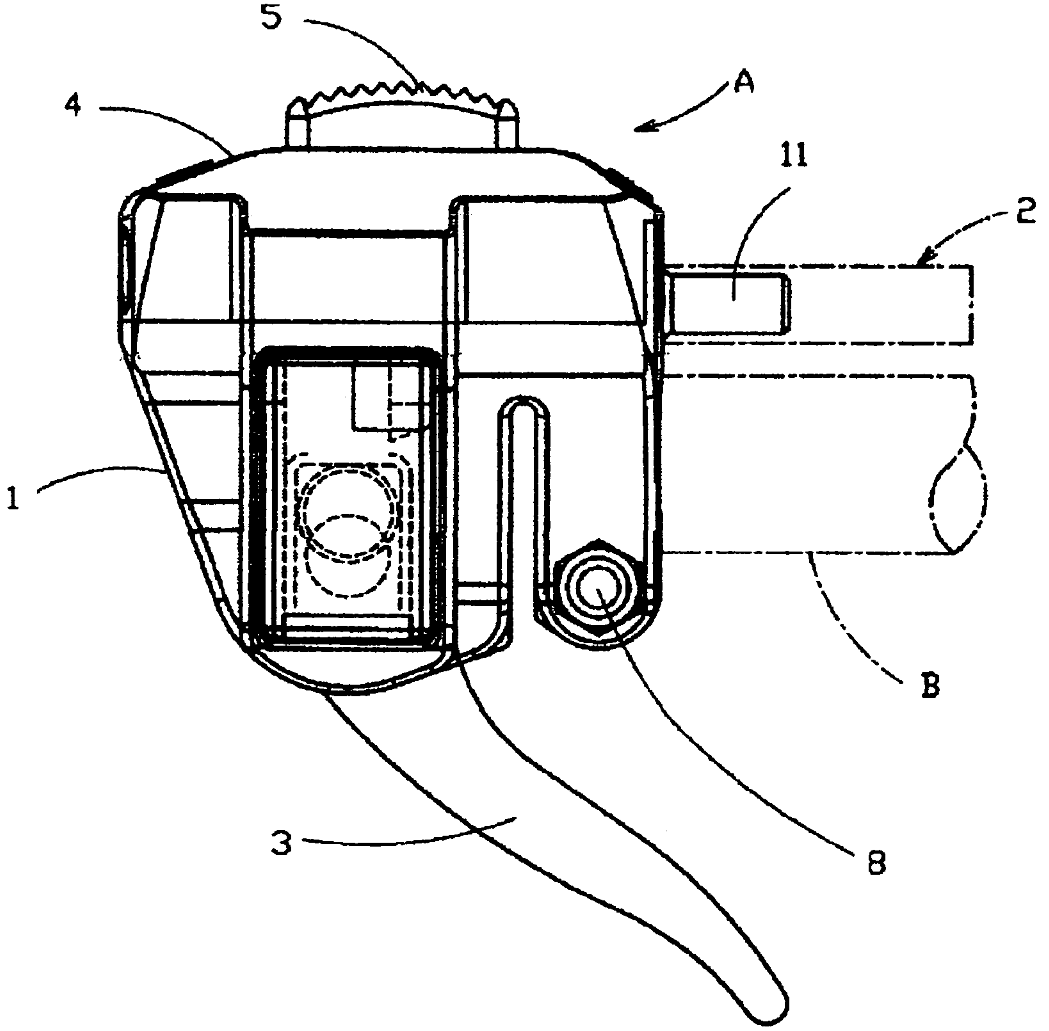
FIG. 1 is a side view of a throttle control device according to the present invention.
Figure 2:
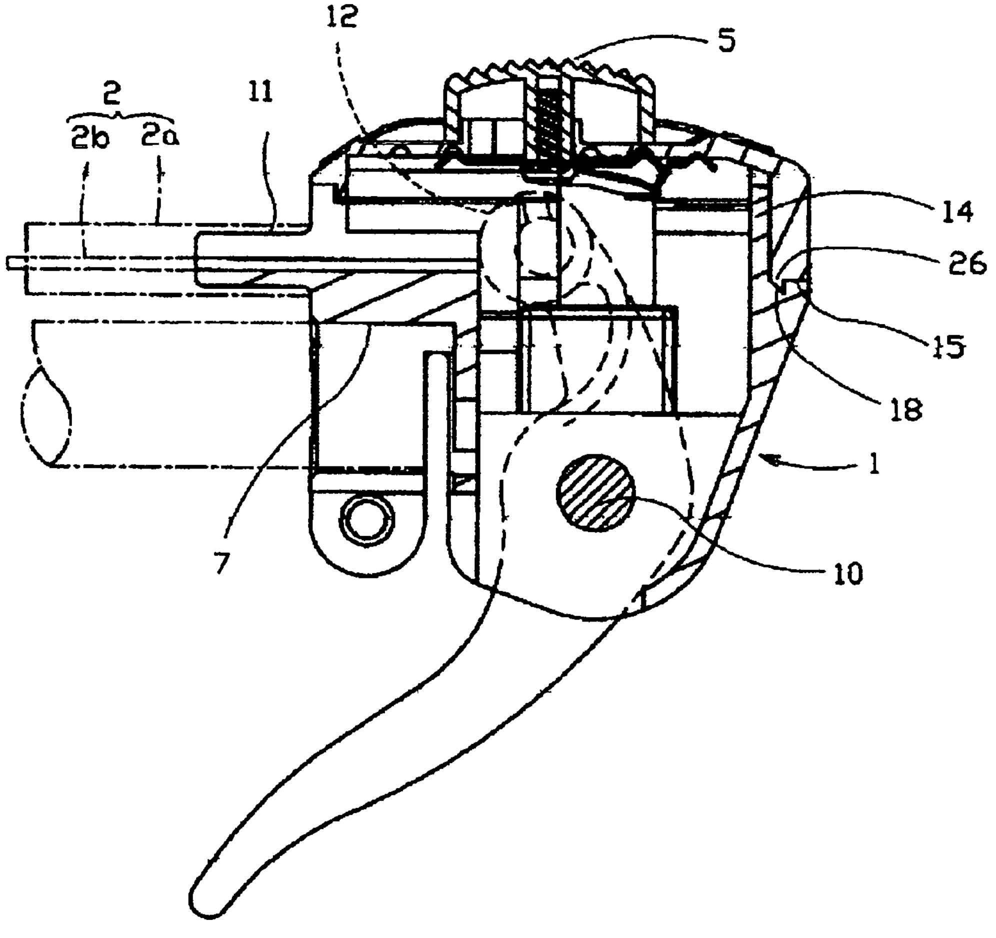
FIG. 2 is a vertical sectional view of the throttle control device.
Figure 3:
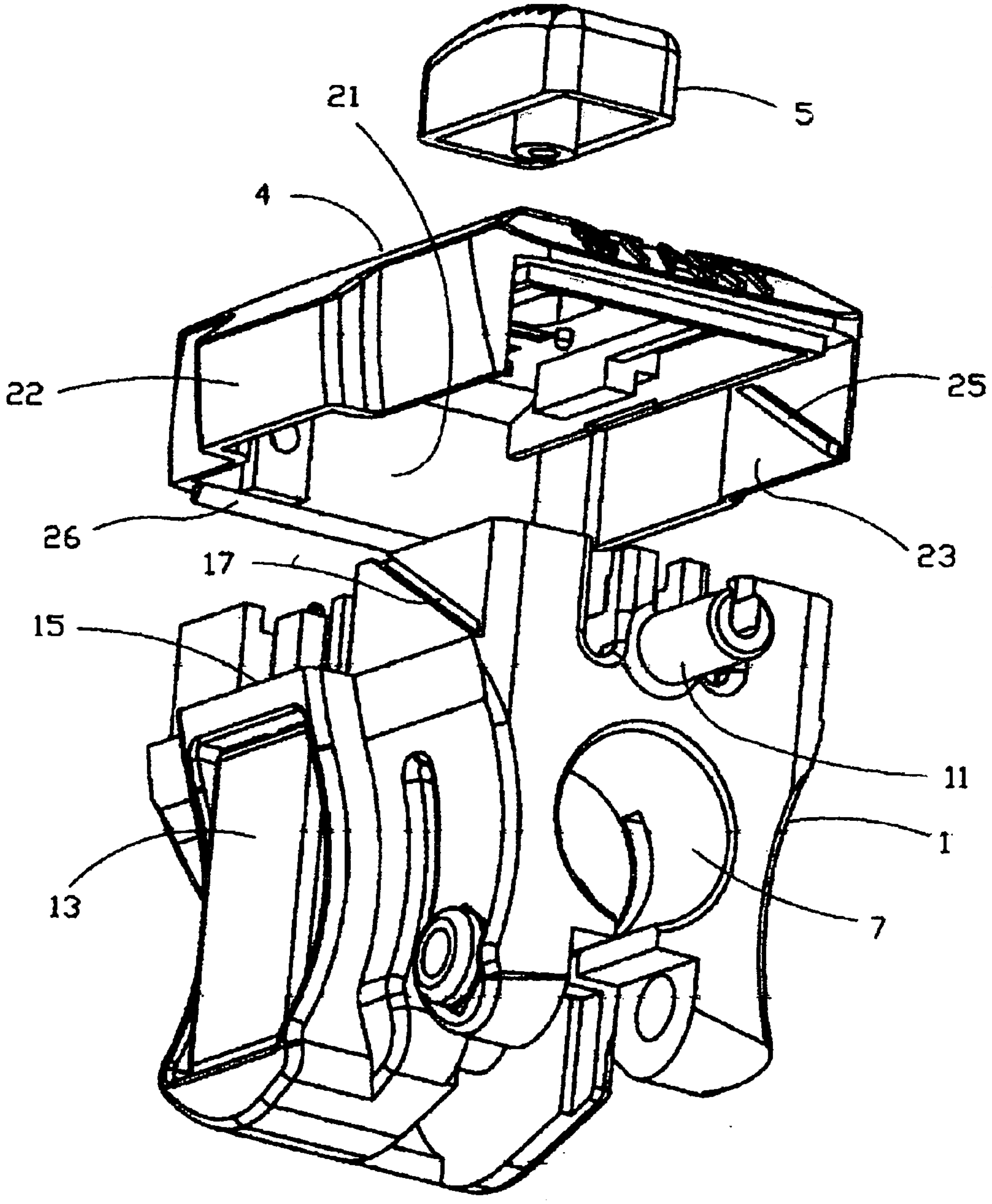
FIG. 3 is an exploded perspective view of the throttle control device.
Figure 4:
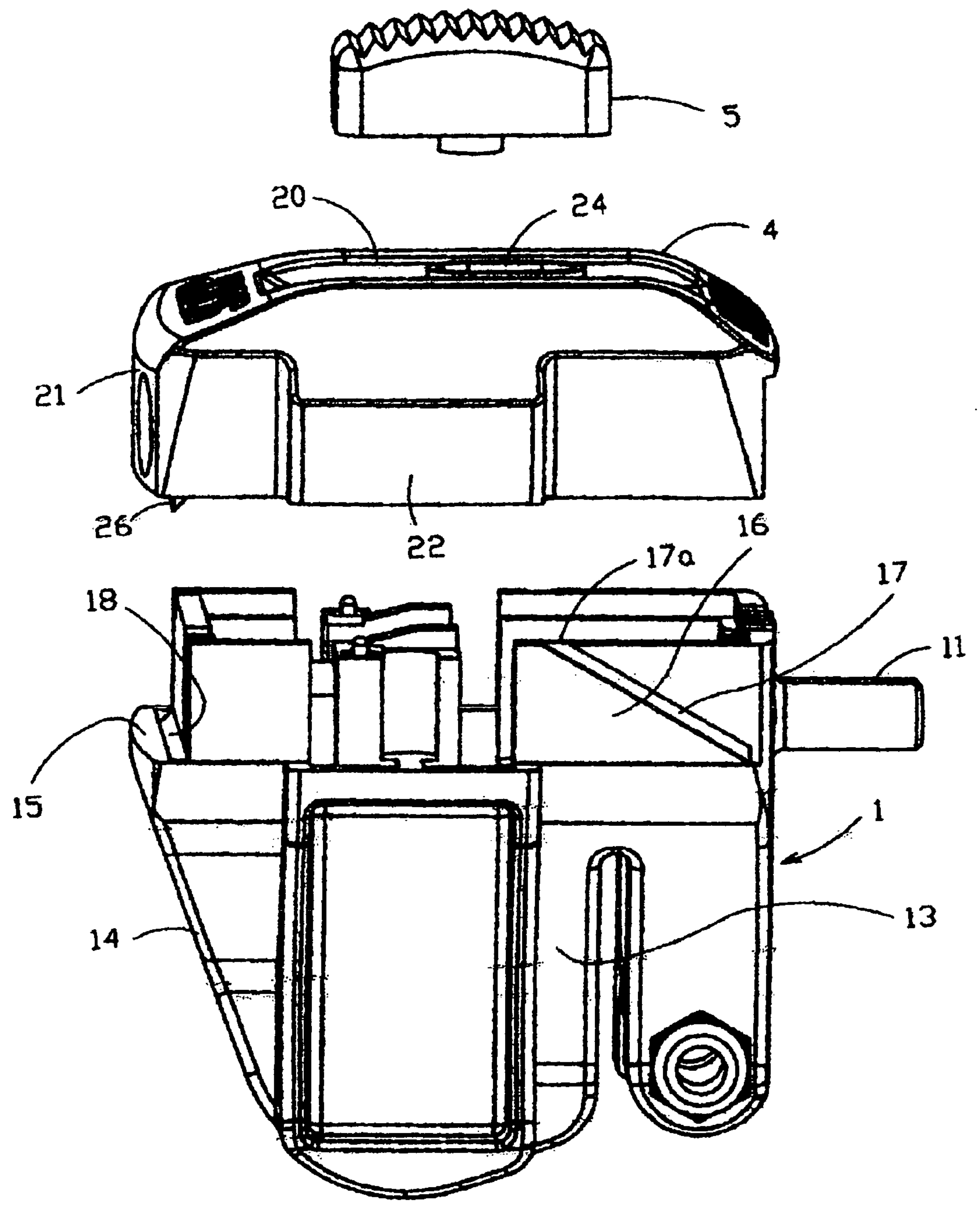
FIG. 4 is an exploded perspective view of the throttle control device viewed from a different direction.
Figure 5:
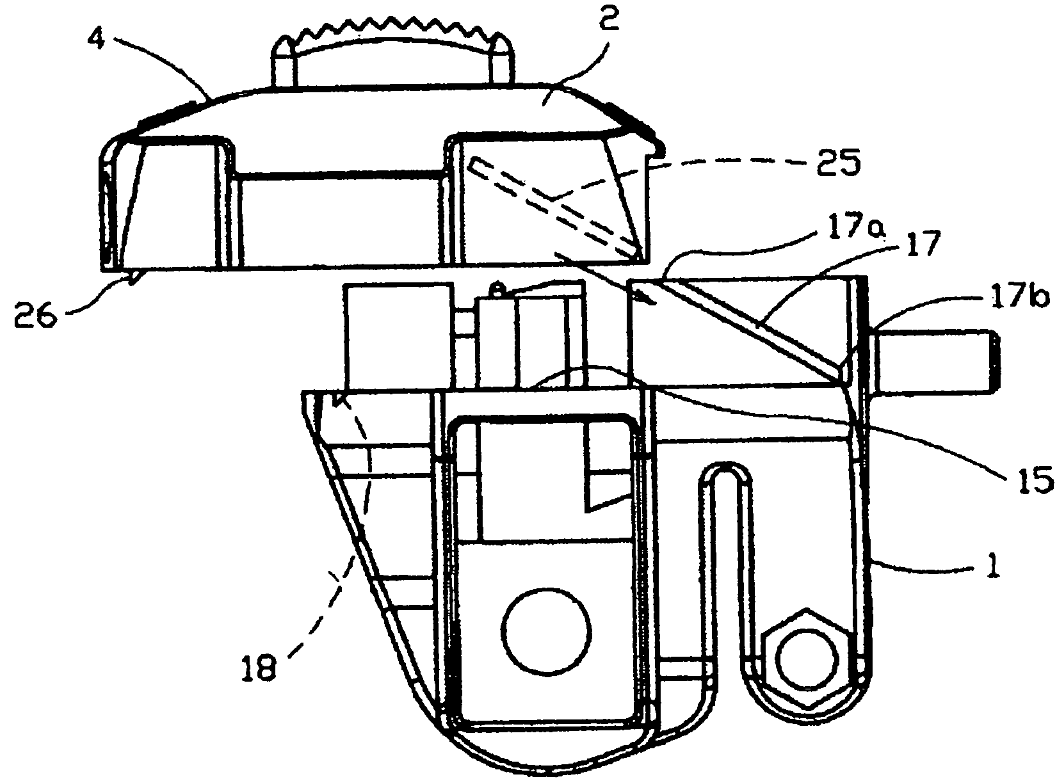
FIG. 5 is an illustrative diagram of mounting of a lid on a device body 1.

A throttle control device
1 device body
4 lid
13 side wall
17 recessed groove
18 locking groove
25 ridge
26 locking protrusion

The invention claimed is:

1. A throttle control device comprising:

a device body secured to an operation handle and having a throttle lever for pulling a control wire; and a lid mounted on an upper portion of said device body and having a start/stop switch button of an engine slidably in a fore/aft direction, wherein a ridge is formed obliquely downward from rear to front on a front portion of one of outer side surfaces of upper opposite side walls of said device body and inner side surfaces of opposite side portions of the lid, a recessed groove slidably engageable along said ridge is obliquely formed in a front portion of the other with the same inclination as said ridge, a locking protrusion protruding downward and a locking groove lockable to said locking protrusion are respectively formed on a lower end surface of a rear portion of said lid and in an upper end surface of a rear portion of said device body that receives the lower end surface of said lid, said ridge is slid along said recessed groove, and the locking protrusion of said lid is pressed downward and locked in the locking groove in said device body at a slide end, which secures said lid on the device body so that said lid is not moved rearward of said device body when said switch button is pressed downward and slid rearward of said device body.

* * * * *